US011984252B2

(12) United States Patent
Kobayashi et al.

(10) Patent No.: US 11,984,252 B2

(45) Date of Patent: May 14, 2024

(54) WINDING-TYPE COIL COMPONENT

(71) Applicant: Murata Manufacturing Co., Ltd., Kyoto-fu (JP)

(72) Inventors: Kohei Kobayashi, Nagaokakyo (JP); Ryota Hashimoto, Nagaokakyo (JP); Hiroyuki Tei, Nagaokakyo (JP); Chihiro Yamaguchi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 510 days.

(21) Appl. No.: 17/135,960

(22) Filed: Dec. 28, 2020

(65) Prior Publication Data

US 2021/0118608 A1 Apr. 22, 2021

Related U.S. Application Data

(62) Division of application No. 15/830,364, filed on Dec. 4, 2017, now Pat. No. 10,910,143.

(30) Foreign Application Priority Data

Dec. 8, 2016 (JP) ................................ 2016-238564

(51) Int. Cl.

*H01F 27/28* (2006.01)
*H01F 17/00* (2006.01)
*H01F 17/04* (2006.01)

(52) U.S. Cl.

CPC ..... *H01F 27/2823* (2013.01); *H01F 17/0033* (2013.01); *H01F 17/04* (2013.01);

(Continued)

(58) Field of Classification Search

CPC ............... H01F 27/2823; H01F 17/045; H01F 2017/0093

(Continued)

(56) References Cited

U.S. PATENT DOCUMENTS

| | | | |
|---|---|---|---|
| 3,402,546 | A | 9/1968 | Peene |
| 5,587,692 | A | 12/1996 | Graham et al. |

(Continued)

FOREIGN PATENT DOCUMENTS

| | | | |
|---|---|---|---|
| CN | 102084440 | A | 6/2011 |
| CN | 103887041 | A | 6/2014 |

(Continued)

OTHER PUBLICATIONS

An Office Action; "Notification of Reasons for Refusal," Mailed by the Japanese Patent Office dated Feb. 26, 2019, which corresponds to Japanese Patent Application No. 2016-238564 and is related to U.S. Appl. No. 15/830,364; with English language translation.

(Continued)

*Primary Examiner* — Bickey Dhakal
*Assistant Examiner* — Joselito S. Baisa
(74) *Attorney, Agent, or Firm* — Studebaker & Brackett PC

(57) ABSTRACT

A winding-type coil component includes a first wire and a second wire having a twisted wire portion where the first wire and the second wire are twisted together. Switching positions of the first wire and the second wire in the twisted wire portion are shifted in a circumferential direction of a winding core portion every turn.

5 Claims, 9 Drawing Sheets

(52) U.S. Cl.
CPC ... *H01F 17/045* (2013.01); *H01F 2017/0093* (2013.01); *H01F 2027/2838* (2013.01)

(58) Field of Classification Search
USPC .......................................................... 336/173
See application file for complete search history.

(56) References Cited

U.S. PATENT DOCUMENTS

| | | | | |
|---|---|---|---|---|
| 6,472,969 | B1 | 10/2002 | Hanato | |
| 6,522,230 | B2 | 2/2003 | Hanato et al. | |
| 7,173,067 | B2 | 2/2007 | Guerra | |
| 7,196,608 | B2 | 3/2007 | Hirai et al. | |
| 8,269,592 | B1 | 9/2012 | McCauley, IV et al. | |
| 8,686,822 | B2 | 4/2014 | Huang et al. | |
| 8,869,383 | B2 | 10/2014 | Xu et al. | |
| 9,852,839 | B2 * | 12/2017 | Takagi | H01F 27/327 |
| 10,692,639 | B2 * | 6/2020 | Jerez | H01F 41/076 |
| 11,798,729 | B2 * | 10/2023 | Igarashi | H01F 17/045 |
| 2004/0263285 | A1 * | 12/2004 | Suzuki | H01F 41/082 333/185 |
| 2006/0033603 | A1 | 2/2006 | Hirai et al. | |
| 2009/0219127 | A1 | 9/2009 | Tomonari et al. | |
| 2010/0148912 | A1 | 6/2010 | Nakatani et al. | |
| 2012/0046575 | A1 | 2/2012 | Brown | |
| 2014/0306789 | A1 | 10/2014 | Hirai et al. | |
| 2015/0061811 | A1 * | 3/2015 | Takagi | H01F 27/292 336/192 |
| 2016/0133377 | A1 * | 5/2016 | Takagi | H01F 27/29 29/605 |
| 2017/0025212 | A1 * | 1/2017 | Jerez | H01F 27/29 |

FOREIGN PATENT DOCUMENTS

| | | | | |
|---|---|---|---|---|
| CN | 107369531 | A * | 11/2017 | H01F 17/045 |
| DE | 102014103324 | A1 | 9/2015 | |
| JP | 2006339250 | A | 12/2006 | |
| JP | 2007036159 | A | 2/2007 | |
| JP | 2014-207368 | A | 10/2014 | |
| WO | WO-2015135703 | A1 * | 9/2015 | H01F 17/045 |
| WO | 2015/178165 | A1 | 11/2015 | |

OTHER PUBLICATIONS

An Office Action mailed by the Chinese Patent Office dated Mar. 4, 2019, which corresponds to Chinese Patent Application No. 201711008192.0 and is related to U.S. Appl. No. 15/830,364; with English language translation.

An Office Action mailed by the Germany Patent Office dated Jul. 3, 2018, which corresponds to Germany Patent Application No. 10 2017 217 043.3 and is related to U.S. Appl. No. 15/830,364 with English language translation.

* cited by examiner

FIG. 1A
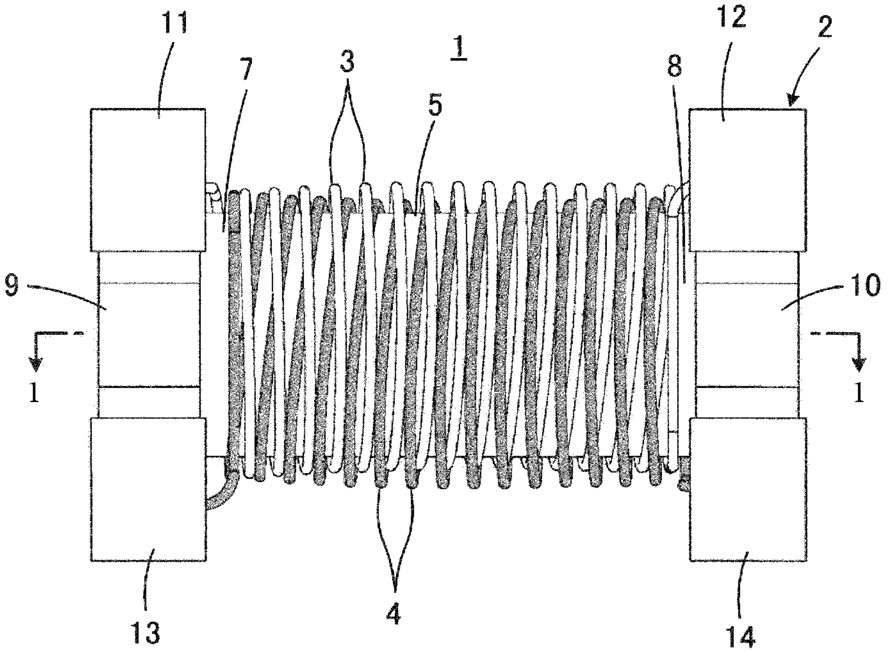
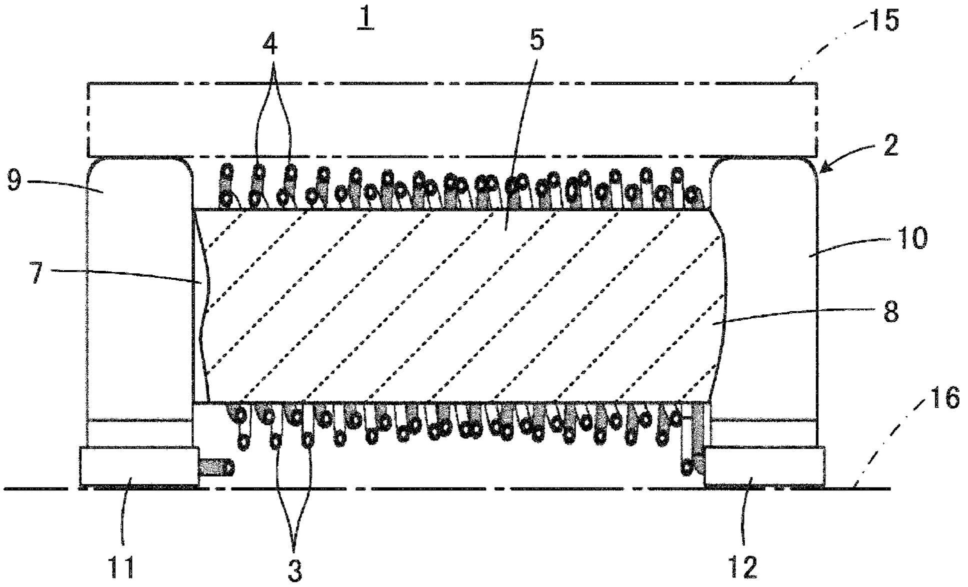
FIG. 1B

FIG. 2A
FIG. 2B
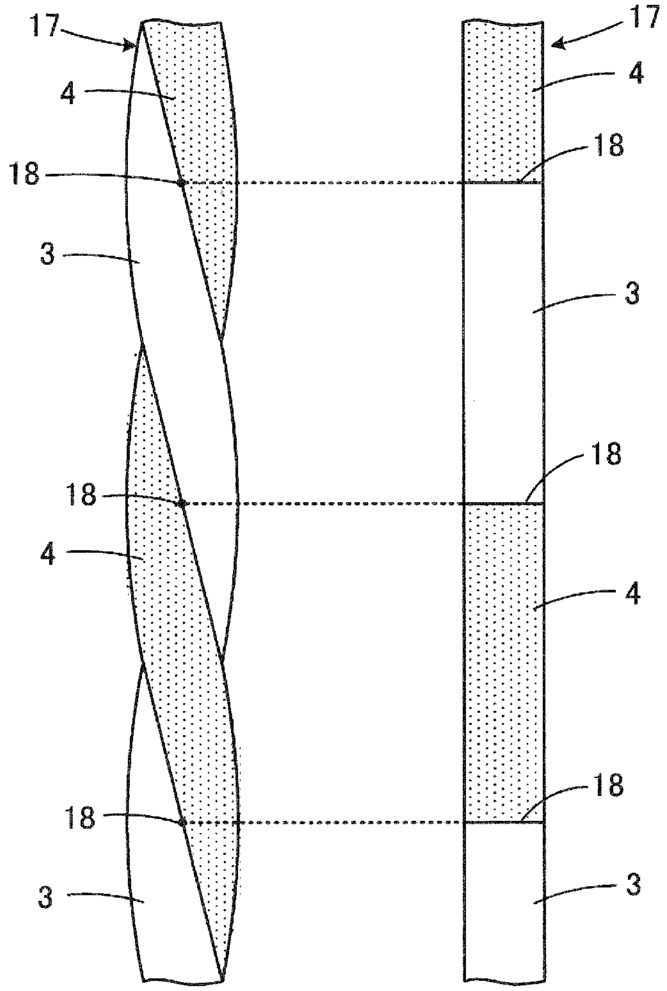
FIG. 3
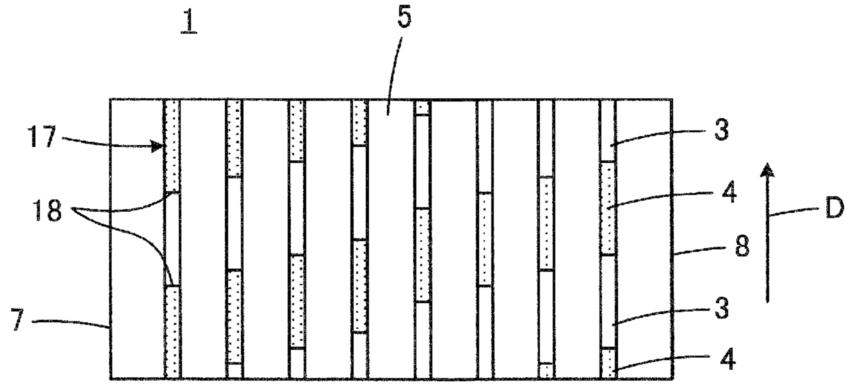

WHEN CLOSE TO MOUNT BOARD

WHEN FAR FROM MOUNT BOARD

WINDING-TYPE COIL COMPONENT

CROSS REFERENCE TO RELATED APPLICATIONS

This application is a Divisional of U.S. patent application Ser. No. 15/830,364 filed Dec. 4, 2017, which claims benefit of priority to Japanese Patent Application 2016-238564 filed Dec. 8, 2016, the entire content of which is incorporated herein by reference.

TECHNICAL FIELD

The present disclosure relates to a winding-type coil component, and, more particularly, to a winding-type coil component having a structure in which two wires that are twisted together are wound around a winding core portion.

BACKGROUND

A winding-type common mode choke coil is a typical example of a winding-type coil component to which the present disclosure is directed.

For example, Japanese Unexamined Patent Application Publication No. 2014-207368 describes a common mode choke coil in which a twisted wire including two wires that are twisted together is wound around a winding core portion. In this way, when two wires are formed into a twisted wire, the form of the first wire and the form of the second wire can be made substantially the same.

SUMMARY

When, as mentioned above, the form of the first wire and the form of the second wire are the same, the difference between the stray capacitance occurring in association the with first wire and the stray capacitance occurring in association with the second wire becomes small, so that, in the common mode choke coil, it may be possible to improve mode conversion characteristics.

However, even if the first and second wires are formed into a twisted wire, the stray capacitance occurring in association the first wire and the stray capacitance occurring in association the second wire are not balanced. Therefore, the difference between the stray capacitance occurring in association with one of the wires and the stray capacitance occurring in association with the other of the wires is sometimes large. The inventor of this subject has pursued the causes thereof.

In Japanese Unexamined Patent Application Publication No. 2014-207368, the details of the state of the twisted wire including the first and second wires that are twisted together are not discussed. The common mode choke coil described in Japanese Unexamined Patent Application Publication No. 2014-207368 is mounted on a mount board defining a reference electrical potential with the winding core portion oriented parallel to the mount board. In this case, the stray capacitances occur not only between the first and second wires, but also between the first wire and the mount board, and between the second wire and the mount board.

Here, when the first and second wires are formed into a twisted wire, regarding the stray capacitance occurring between the first and second wires is balanced to a certain extent. In contrast, even if the first and second wires are formed into a twisted wire, it is difficult to balance the stray capacitance occurring between the mount board and the first wire and the stray capacitance occurring between the mount board and the second wire in each turn, as a result of which the difference between these stray capacitances is large. This is considered below.

When the first and second wires are twisted together, the twisted wire includes some turns which has the same disposition of the first wire and the second wire. In particular, when the first and second wires are wound around the winding core portion while twisting the first and second wires automatically by the equipment in the mass production, since the twisting operation and the winding operation are in synchronism, all of the turns in the twisted wire have the same disposition of the first wire and second wire. The stray capacitances is determined by the distances between the wires and the mount board and opposing areas of the wires and the mount board. In this case, therefore either one of the stray capacitance occurring between the first wire and the mount board (at the first wire side) and the stray capacitance occurring between the second wire and the mount board (at the second wire side) is larger in each turn of the twisted wire. Then the difference between the stray capacitance at the first wire side and the stray capacitance at the second wire side accumulates in all turns and becomes larger.

The difference between the stray capacitance at the first wire side and the stray capacitance at the second wire side makes mode conversion characteristics deteriorate.

Similar problems, in particular, problems regarding differences between capacitances not only occur in common mode choke coils but also in winding type coil components, such as balun or transformers, including two wires that are wound around a winding coil portion with the two wires in a twisted state.

Accordingly, it is an object of the present disclosure to provide a winding-type coil component having a structure that allows the difference between the stray capacitance occurring between a mount board and a first wire and the stray capacitance occurring between the mount board and a second wire to be small.

According to one embodiment of the present disclosure, a winding-type coil component includes a core that includes a winding core portion and a first flange portion and a second flange portion, the first flange portion and the second flange portion being provided on a first end of the winding core portion and a second end of the winding core portion, respectively, the first end and the second end being opposite to each other; and a first wire and a second wire wound around the winding core portion with substantially the same number of turns, not electrically connected to each other, and having a twisted wire portion where the first wire and the second wire are twisted together. The winding-type coil component is mounted on a mount board with the winding core portion oriented parallel to the mount board.

In the winding-type coil component, switching positions of the first wire and the second wire in the twisted wire portion are shifted in a circumferential direction of the winding core portion every turn (refer to FIG. 3 and FIGS. 7 to 9).

In the winding-type coil component, it is possible to prevent either one of the stray capacitance occurring between the mount board and the first wire and the stray capacitance occurring between the mount board and the second wire from becoming large due to the stray capacitance being distributed towards either one of the stray capacitance at a first wire side and the stray capacitance at a second wire side.

In the winding-type coil component, when viewed from the mount board, a disposition of the first wire and the second wire in a first turn of the twisted wire portion may be the same as or reverse to a disposition of the first wire and the second wire in a last turn of the twisted wire portion. (Refer to FIGS. 7 and 8.) According to this structure, regarding the entire first and second wires in the twisted wire portion, the total length of a portion of the first wire that is closer to the mount board and the total length of a portion of the second wire that is closer to the mount board can be made close to each other.

In the winding-type coil component, a total of shift amounts of the switching positions in all turns of the twisted wire portion may be greater than a distance between adjacent switching positions in a same turn (refer to FIG. 9). According to this structure, in a portion between the first turn of the twisted wire portion and the last turn of the twisted wire portion, there exist some turns which have the disposition of the first and second wires viewed from the mount board reverse to each other. Therefore, regarding the entire first and second wires in the twisted wire portion, the difference between the total length of the portion of the first wire that is closer to the mount board and the total length of the portion of the second wire that is closer to the mount board can be made less than or equal to a certain difference. Consequently, the difference between the stray capacitance at the first wire side and the stray capacitance at the second wire side can fall within a certain range.

In another embodiment according to the present disclosure, when viewed from the mount board, a total length of a portion of the first wire that is closer to the mount board than the second wire and a total length of a portion of the second wire that is closer to the mount board than the first wire are equal to each other in each N turns of the twisted wire portion that are adjacent to each other, and N is a natural number (refer to FIGS. 11 to 14).

By virtue of such a structure described above, the total length of the portion of the first wire that is closer to the mount board and the total length of the portion of the second wire that is closer to the mount board can be the same in each N turns.

In the embodiment described above, N may be one (refer to FIG. 11 to 13).

By virtue of such a structure described above, the total length of the portion of the first wire that is closer to the mount board and the total length of the portion of the second wire that is closer to the mount board can be the same in each turn.

In the embodiments described above, a surface of the winding core portion facing the mount board may be a planar surface that is parallel to the mount board, and a sectional shape of the winding core portion that is perpendicular to a central axis thereof may be a substantially rectangular shape. According to such structures, the stray capacitance occurring between the mount board and the first and second wires are proportional to the total length of the portion of the first and second wires that is closer to the mount board. Therefore, it becomes easier to provide a design for equalizing the stray capacitance occurring in association with the first wire and the stray capacitance occurring in association with the second wire.

In another embodiment according to the present disclosure, a sectional shape of the winding core portion that is perpendicular to a central axis thereof is a substantially protruding shape extending towards the mount board. In the embodiment, when viewed from the mount board, a facing area of the nearest wire to the mount board between the first wire and second wire is smaller than a facing area of the other wire between the first wire and the second wire (refer to FIGS. 15 to 20).

In the embodiment described above, a difference between the stray capacitance at the first wire side and the stray capacitance at the second wire side can be reduced.

In the winding-type coil component according to the embodiments of the present disclosure may further include a first terminal electrode and a third terminal electrode that are provided on the first flange portion; and a second terminal electrode and a fourth terminal electrode that are provided on the second flange portion, with one end portion and the other end portion of the first wire being connected to the first terminal electrode and the second terminal electrode, respectively, and one end portion and the other end portion of the second wire being connected to the third terminal electrode and the fourth terminal electrode, respectively. This structure is used in, for example, a common mode choke coil.

In the winding-type coil component according to the embodiments of the present disclosure, the number of turns of each of the first and second wires may be about 15 or more. For example, in the winding-type coil component having a planar dimension of about 4.5 mm×3.2 mm, when the number of turns is about 15 or more, it is possible to obtain an inductance of at least about 50 μH.

In the winding-type coil component according to the embodiments of the present disclosure, the number of twists of the twisted wire portion per one turn is about three or less, that is, the number of switchings of the first and second wires in the twisted wire portion per one turn is about six or less. In this way, when the number of twists is a small number of twists of about three or less, the opposing area between the mount substrate and one of the two wires and the opposing area between the mount substrate and the other of the two wires, and the distance between the mount substrate and one of the two wires and the distance between the mount substrate and the other of the two wires tend to differ from each other. Therefore, since mode conversion characteristics tend to deteriorate, the structure according to the present disclosure is more effective.

According to the present disclosure, it is possible to reduce the difference between the stray capacitance occurring between the mount board, on which the winding-type coil component is mounted, and the first wire and the stray capacitance occurring between the mount board and the second wire. Therefore, when the winding-type coil component is a common mode choke coil, it is possible to improve mode conversion characteristics.

Other features, elements, characteristics and advantages of the present disclosure will become more apparent from the following detailed description with reference to the attached drawings.

BRIEF DESCRIPTION OF THE DRAWINGS

FIGS. 1A and 1B illustrate a common mode choke coil, serving as a winding-type coil component, according to a first embodiment of the present disclosure, with FIG. 1A being a bottom view of a surface facing a mount board and FIG. 1B being a front view and a partial sectional view along line 1-1 in FIG. 1A.

FIG. 2A is an enlarged view of a state in which a first wire and a second wire are twisted together.

FIG. 2B shows a form of illustration of a twisted wire including the two wires, the form of illustration being used in subsequent figures below.

FIG. 3 shows in the form shown in FIG. 2B a wound state of the first and second wires viewed from a mount-board side of the common mode choke coil shown in FIG. 1.

DETAILED DESCRIPTION

First Embodiment

Figure 4:
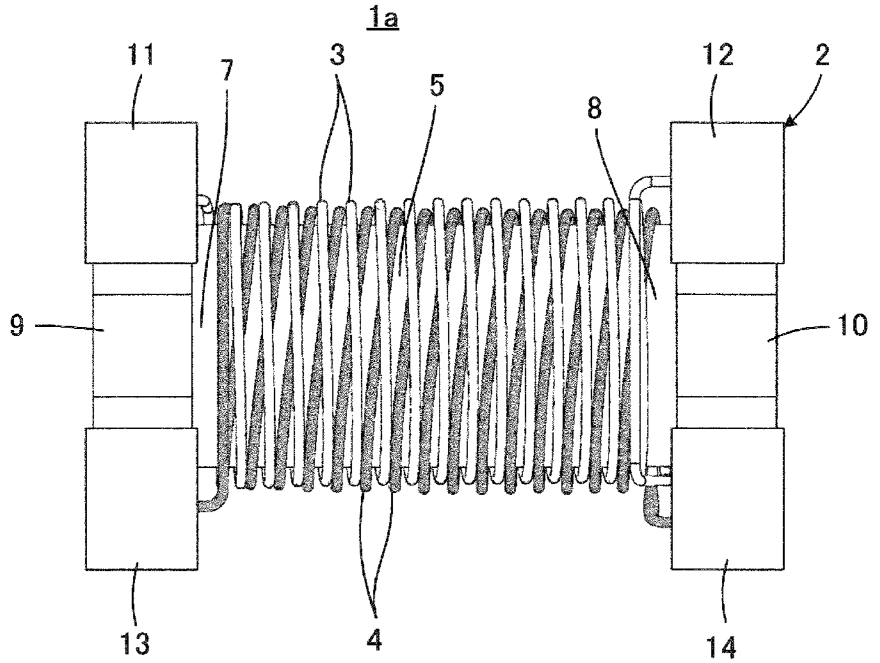
FIG. 4 is a bottom view corresponding to FIG. 1A and showing a common mode choke coil according to a comparative example.

A common mode choke coil 1, serving as a coil component, according to a first embodiment of the present disclosure is described with reference to FIG. 1.

The common mode choke coil 1 includes a substantially drum-shaped core 2, and a first wire 3 and a second wire 4, each constituting an inductor. In FIG. 1, in order to make it possible to clearly distinguish between the first wire 3 and the second wire 4, the first wire 3 is shown in white and the second wire 4 is shown in black.

The core 2 is made of an electric insulating material, more specifically, for example, a nonmagnetic material, such as alumina, a magnetic material, such as Ni—Zn-based ferrite, or resin. The wires 3 and 4 are each made of, for example, a copper wire subjected to insulating coating.

The core 2 includes a winding core portion 5, and a first flange portion 9 and a second flange portion 10. The first flange portion 9 and the second flange portion 10 are provided on a first end 7 of the winding core portion 5 and a second end 8 of the winding core portion 5, respectively. The first end 7 and the second end 8 are opposite to each other. The sectional shape of the winding core portion 5 that is perpendicular to a central axis thereof is a substantially rectangular shape.

A first terminal electrode 11 and a third terminal electrode 13 are provided on the first flange portion 9. A second terminal electrode 12 and a fourth terminal electrode 14 are provided on the second flange portion 10. The terminal electrodes 11 and 14 are formed by, for example, baking a conductive paste, plating with a conductive metal, or attaching a conductive metallic piece.

One end portion and the other end portion of the first wire 3 is connected to the first terminal electrode 11 and the second terminal electrode 12, respectively. One end portion and the other end portion of the second wire 4 is connected to the third terminal electrode 13 and the fourth terminal electrode 14, respectively. These connections are performed by, for example, thermal pressure bonding or welding.

Excluding the end portions of the first wire 3 that are connected to the first terminal electrode 11 and the second terminal electrode 12 and the end portions of the second wire 4 that are connected to the third terminal electrode 13 and the fourth terminal electrode 14, most of the first wire 3 and most of the second wire 4 are twisted together and configure a twisted wire portion. Ordinarily, the first wire 3 and the second wire 4 are twisted together while winding the first wire 3 and the second wire 4 around the winding core portion 5. The first wire 3 and the second wire 4 in the twisted wire portion are helically wound around the winding core portion 5 with substantially the same number of turns. Since, as mentioned above, the first wire 3 and the second wire 4 are subjected to insulating coating, the first wire 3 and the second wire 4 are not electrically connected to each other.

The first wire 3 and the second wire 4 may have portions that are not twisted together other than at the end portions of the first wire 3 that are connected to the terminal electrodes 11 and 12 and at the end portions of the second wire 4 that are connected to the terminal electrodes 13 and 14. That is, a first wire 3 and the second wire 4 have at least a twisted wire portion where the first wire 3 and the second wire 4 are twisted together.

As shown by an alternate long and two short dashed line in FIG. 1B, the common mode choke coil 1 may include a substantially plate-shaped core 15. As with the substantially drum-shaped core 2, the substantially plate-shaped core 15 is made of, for example, a nonmagnetic material, such as alumina, a magnetic material, such as Ni—Zn-based ferrite, or resin. When the substantially drum-shaped core 2 and the substantially plate-shaped core 15 are made of magnetic materials, the substantially plate-shaped core 15 is provided so as to connect the first flange portion 9 and the second flange portion 10, so that the substantially drum-shaped core 2 cooperates with the substantially plate-shaped core 15 to form a closed magnetic path.

As shown by an alternate long and short dashed line in FIG. 1B, the common mode choke coil 1 is intended to be mounted on a mount board 16. That is, the common mode choke coil 1 is intended to be mounted on the mount board 16 with the winding core portion 5 oriented parallel to the mount board 16 for applying a reference potential. At this time, the terminal electrodes 11 to 14 face the mount board 16, and are electrically and mechanically connected to conductive lands of the mount board 16.

FIGS. 2A and 2B show forms of illustrations of a twisted wire portion 17 including the two wires, that is, the wires 3 and 4, the forms of illustration being used in, for example, FIG. 3 and subsequent figures. FIG. 2A is an enlarged front view of the twisted wire portion 17 where the first wire 3 and the second wire 4 are twisted together. FIG. 2B schematically shows the twisted wire portion 17 in FIG. 2A including the first wire 3 and the second wire 4. In FIGS. 2A and 2B, in order to make it possible to clearly distinguish between the first wire 3 and the second wire 4, the first wire 3 is shown in white and the second wire 4 is shown shaded. Although, in FIG. 2A, the twisted wire portion 17 is a Z-shaped twisted wire, the twisted wire may be an S-shaped twisted wire whose twisting direction is opposite to that of the Z-shaped twisted wire, or may be a wire including a Z-shaped twisted wire and an S-shaped twisted wire.

FIG. 2A intends to show that the mount board 16 shown in FIG. 1B is positioned at a near side in the plane of FIG. 2A. Therefore, the winding core portion 5 exists on the far side in the plane of FIG. 2A.

In the twisted wire portion 17 of the first wire 3 and the second wire 4 viewed from the mount board 16, as shown in FIG. 2A, when a direction that is perpendicular to the direction of extension of the twisted wire portion 17 is defined as a width direction, switching positions 18 of the first wire 3 and the second wire 4 are defined as positions where a wire that is larger in the width direction as viewed from the near side in the plane of FIG. 2A (that is, from the mount board 16) is switched from either one of the first wire 3 and the second wire 4 to the other of the first wire 3 and the second wire 4. In FIG. 2B, the twisted wire portion 17 is shown as a single wire, or a portion from a switching position 18 to the next switching position 18 is shown as the first wire 3 or the second wire 4. Such forms of illustrations are used in, for example, FIG. 3 and subsequent figures.

The term "switching" means that the position of the first wire 3 and the position of the second wire 4 viewed from the mount board are directly opposite to each other. Two "switchings" are equivalent to one twist.

The wound state of the twisted wire portion 17 including the first wire 3 and the second wire 4 of the common mode choke coil 1 shown in FIG. 1 is schematically shown in FIG. 3. In FIG. 1, a portion of the first wire 3 and a portion of the second wire 4 of the twisted wire portion 17 are shown as being separated from each other. However, as shown in FIG. 2A, the first wire 3 and the second wire 4 may be twisted together while in contact with each other. Although the states of the twisted wire portion 17 shown in FIGS. 1 and 3 are not the same, the wound state of the twisted wire portion 17 is described with reference to FIG. 3.

With reference to FIG. 3, in the common mode choke coil 1, the switching positions 18 of the first wire 3 and the second wire 4 in the twisted wire portion are shifted in the circumferential direction D of the winding core portion 5 every turn.

By virtue of such a structure described above, it is possible to prevent an accumulation amount (length, area) of a region where each wire opposes the mount board from being distributed towards one of the first wire 3 and the second wire 4. Therefore, it is possible to reduce the difference between the stray capacitance occurring between the mount board, on which the common mode choke coil 1 is mounted, and the first wire 3 and the stray capacitance occurring between the mount board, on which the common mode choke coil 1 is mounted, and the second wire 4. Therefore, it is possible to improve mode conversion characteristics of the common mode choke coil 1.

Figure 5:
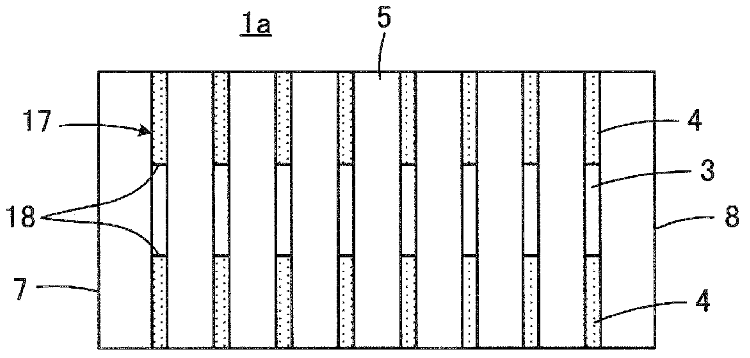
FIG. 5 shows in the form shown in FIG. 2B a wound state of first and second wires viewed from a mount-board side of the common mode choke coil shown in FIG. 4.

FIG. 4 is a bottom view of a common mode choke coil 1*a* according to a comparative example. FIG. 4 corresponds to FIG. 1A. FIG. 5 shows in the form shown in FIG. 2B a wound state of a first wire 3 and a second wire 4 viewed from a mount-board side of the common mode choke coil 1*a* shown in FIG. 4. In FIGS. 4 and 5, corresponding elements to those shown in FIGS. 1A and 1B and FIG. 3 are given the same reference numerals, and the same descriptions thereof are not repeated.

In the common mode choke coil 1*a* according to the comparative example, switching positions 18 of the first wire 3 and the second wire 4 in the twisted wire portion are not shifted in the circumferential direction D. In this case, if there is a difference between the stray capacitance at the first wire 3 and the stray capacitance at the second wire 4 in one turn, the difference between the stray capacitance occurring between the mount board, on which the common mode choke coil 1*a* is mounted, and the first wire 3 and the stray capacitance occurring between the mount board, on which the common mode choke coil 1*a* is mounted, and the second wire 4 accumulates as the winding extends. Therefore, the difference is larger than that in the common mode choke coil 1. Consequently, it is presumed that mode conversion characteristics deteriorate.

Figure 6A:
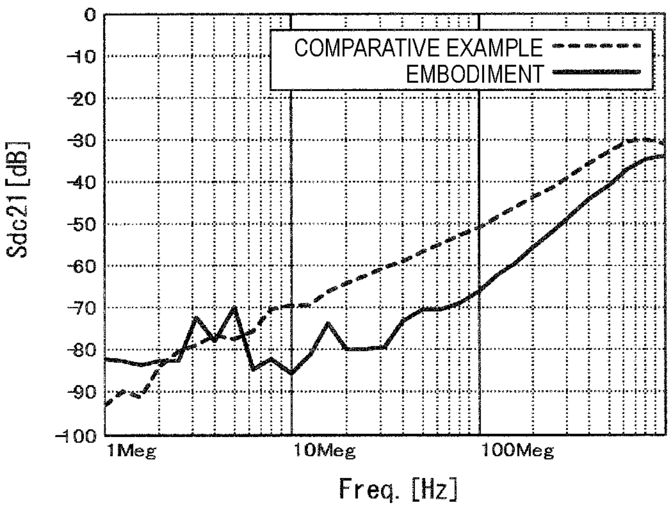
FIGS. 6A and 6B each show a comparison between S-(Scattering)-parameter (Sdc21) frequency characteristics of the common mode choke coil according to the embodiment of the present disclosure and S-parameter (Sdc21) frequency characteristics of the common mode choke coil according to the comparative example, the comparisons being indicated for two cases, that is, a case shown in FIG. 6A in which the wires are close to the mount board and a case shown in FIG. 6B in which the wires are far from the mount board.
Figure 6B:
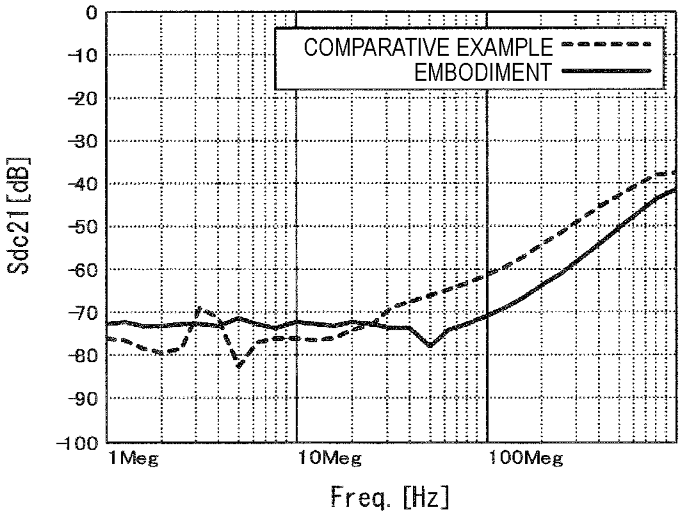

FIGS. 6A and 6B each show a comparison between S-(Scattering)-parameter-(Sdc21) frequency characteristics, which are indicators of mode conversion characteristics, of the common mode choke coil 1 according to the embodiment of the present disclosure and S-parameter-(Sdc21) frequency characteristics, which are indicators of mode conversion characteristics, of the common mode choke coil 1*a* according to the comparative example, the comparisons being indicated for two cases, that is, a case shown in FIG. 6A in which the wires are close to the mount board and a case shown in FIG. 6B in which the wires are far from the mount board.

In FIGS. 6A and 6B, the characteristics of the common mode choke coil 1 according to the embodiment are indicated by a solid line, and the characteristics of the common mode choke coil 1*a* according to the comparative example are indicated by a broken line. Here, the common mode choke coils 1 and 1*a*, serving as samples, each have a planar dimension of about 3.2 mm×2.5 mm, the thickness of the substantially plate-shaped core 15 (refer to FIG. 1B) is about 0.7 mm, the diameters of the wires 3 and 4 are about 30 μm, and the number of turns is about 15. In the common mode choke coil 1 according to the embodiment, the shift amount between the switching positions 18 for adjacent turns is about 1/15 of an outer periphery.

FIGS. 6A and 6B show that, according to the common mode choke coil 1 according to the embodiment, Sdc21 is improved by approximately 7 dB in a frequency range greater than about 100 MHz compared to that in the common mode choke coil 1*a* according to the comparative example. Such an improvement in Sdc21 occurs when (A) the wires are close to the mount board and (B) when the wires are far from the mount board, so that the improvement does not depend upon the distance between each entire wire and the mount board.

In the description below, FIGS. 7 to 14 and FIG. 16 are referred to. FIGS. 7 to 14 and FIG. 16 correspond to FIG. 3. Therefore, in each of FIGS. 7 to 14 and FIG. 16, elements corresponding to those shown in FIG. 3 are given the same reference numerals, and the same descriptions are not repeated.

Second Embodiment

A common mode choke coil 21, serving as a coil component, according to a second embodiment of the present disclosure is described with reference to FIG. 7.

The second embodiment is a special mode of the first embodiment. Therefore, the second embodiment includes the structure according to the first embodiment in which the switching positions 18 of the first wire 3 and the second wire 4 in the twisted wire portion are shifted in the circumferential direction D of the winding core portion 5 every turn, and also the following characteristic structure.

Figure 7:
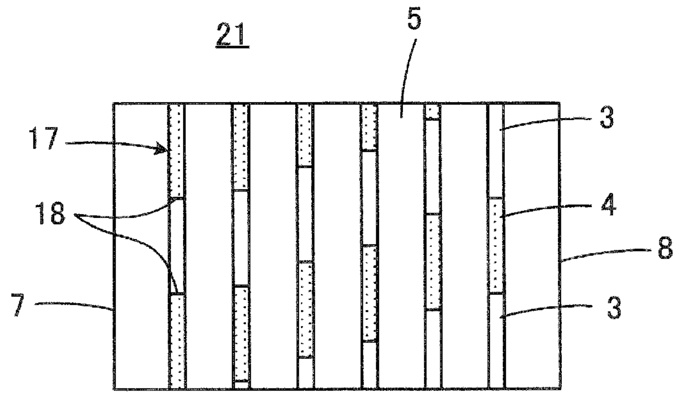
FIG. 7 shows in the form shown in FIG. 2B a wound state of first and second wires viewed from a mount-board side of a common mode choke coil according to a second embodiment of the present disclosure.

That is, as shown in FIG. 7, when viewed from the mount board, a disposition of the first wire 3 and the second wire 4 in the first turn of the twisted wire portion is reverse to a disposition of the first wire 3 and the second wire 4 in the last turn of the twisted wire portion.

According to this structure, regarding the entire first wire 3 and the entire second wire 4 in the twisted wire portion, the total length of a portion of the first wire 3 that is closer to the mount board and the total length of a portion of the second wire 4 that is closer to the mount board can be made close to each other.

Third Embodiment

Figure 8:
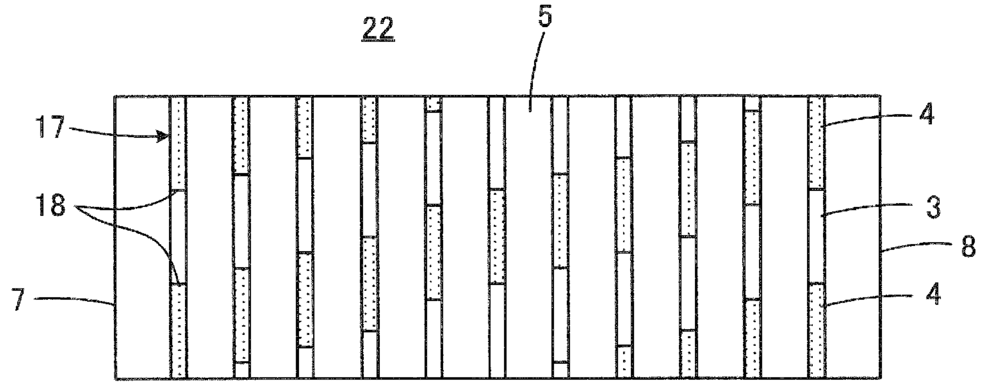
FIG. 8 shows in the form shown in FIG. 2B a wound state of first and second wires viewed from a mount-board side of a common mode choke coil according to a third embodiment of the present disclosure.

A common mode choke coil 22, serving as a coil component, according to a third embodiment of the present disclosure is described with reference to FIG. 8.

As with the second embodiment, the third embodiment is a special mode of the first embodiment. Therefore, the third embodiment also includes the structure according to the first embodiment in which the switching positions 18 of the first wire 3 and the second wire 4 in the twisted wire portion are shifted in the circumferential direction D of the winding core portion 5 every turn.

In the third embodiment, when viewed from the mount board, a disposition of the first wire 3 and the second wire 4 in the first turn of the twisted wire portion is the same as a disposition of the first wire 3 and the second wire 4 in the last turn of the twisted wire portion. A disposition of the first wire 3 and the second wire 4 in the intermediate turn of the twisted wire portion is reverse to the disposition of the first wire 3 and the second wire 4 in the first turn and the last turn.

Even according to this structure, regarding the entire first wire 3 and the entire second wire 4, the total length of a portion of the first wire 3 that is closer to the mount board and the total length of a portion of the second wire 4 that is closer to the mount board can be made equal to each other.

The effects provided by the above-described second and third embodiments can be provided if the disposition of the first wire 3 and the second wire 5 in the first turn of the twisted wire portion is the same as or reverse to the disposition of the first wire 3 and the second wire 4 in the last turn of the twisted wire portion. However, the intermediate turn where the disposition of the first wire 3 and the second wire 4 is the same as or reverse to the disposition of the first wire 3 and the second wire 4 in the first turn or the last turn may be any number of turns. There may be a plurality of the intermediate turns.

Fourth Embodiment

A common mode choke coil 23, serving as a coil component, according to a fourth embodiment of the present disclosure is described with reference to FIG. 9.

As with the second and third embodiments, the fourth embodiment is a special mode of the first embodiment. Therefore, the fourth embodiment also includes the structure according to the first embodiment in which the switching positions 18 of the first wire 3 and the second wire 4 in the twisted wire portion are shifted in the circumferential direction D of the winding core portion 5 every turn.

Further, in the fourth embodiment, the total of shift amounts 19 of the switching positions 18 in all turns of the twisted wire portion is greater than the distance between adjacent switching positions 18*a* and 18*b* in a same turn. The switching position 18*a* is the position where the first wire 3 switches to the second wire 4, and the switching position 18*b* is the position where the second wire 4 switches to the first wire 3.

Even according to this structure, in a portion between the first turn of the twisted wire portion and the last turn of the twisted wire portion, there exist some turns which have the disposition of the first wire 3 and the second wire 4 viewed from the mount board reverse to each other. Therefore, regarding the entire first wire 3 and the entire second wire 4 in the twisted wire portion, the difference between the total length of a portion of the first wire 3 that is closer to the mount board and the total length of a portion of the second wire 4 that is closer to the mount board can be less than or equal to a certain difference, that is, can be less than or equal to the distance between the switching position 18*a* and the switching position 18*b*. Consequently, the difference between the stray capacitance at the first wire 3 side and the stray capacitance at the second wire 4 side can fall within a certain range.

Figure 9:
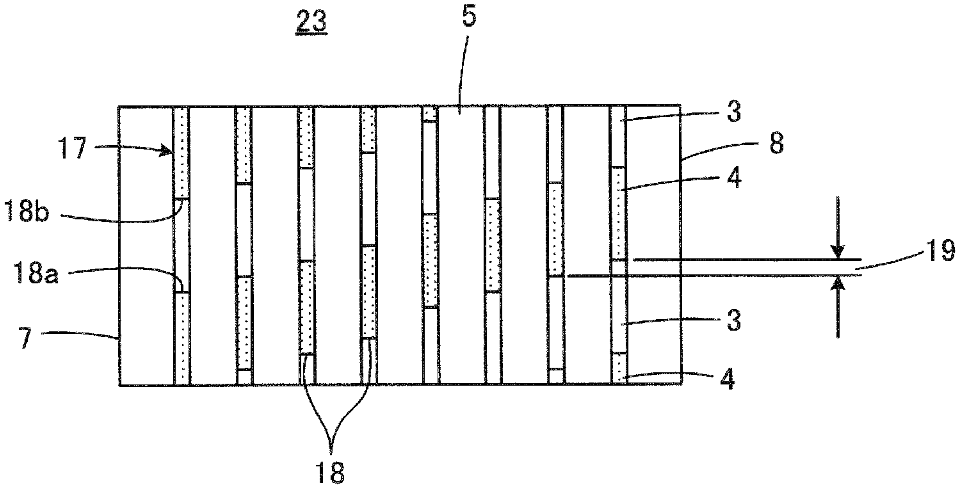
FIG. 9 shows in the form shown in FIG. 2B a wound state of first and second wires viewed from a mount-board side of a common mode choke coil according to a fourth embodiment of the present disclosure.
Figure 10:
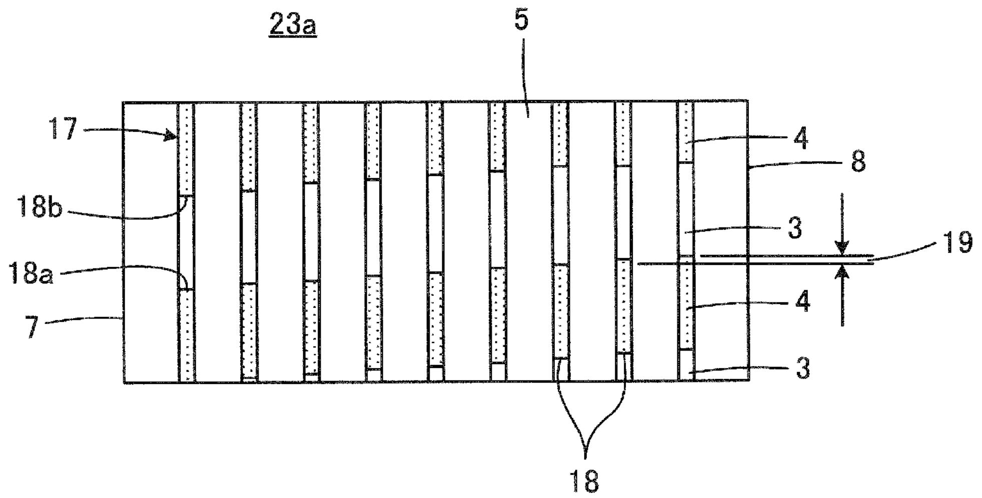
FIG. 10 shows in the form shown in FIG. 2B a wound state of first and second wires viewed from a mount-board side of a common mode choke coil according to a comparative example of the embodiment shown in FIG. 9.

FIG. 10 corresponds to FIG. 9, and shows a common mode choke coil 23*a* according to a comparative example of the embodiment shown in FIG. 9. The number of turns of wires 3 and of the common mode choke coil 23 shown in FIG. 9 and the number of turns of wires 3 and 4 of the common mode choke coil 23*a* shown in FIG. 10 are the same.

Unlike the above-described case, as shown in FIG. 10, when a shift amount 19 between switching positions 18 of the first wire 3 and the second wire 4 in the twisted wire portion is small, any turns where the dispositions of the first wire 3 and the position of the second wire 4 are reverse to each other cannot both exist together. Therefore, regarding the entire first wire 3 and the entire second wire 4, the difference between the length of a portion of the first wire 3 that is closer to the mount board and the length of a portion of the second wire 4 that is closer to the mount board remains relatively large, and cannot be less than or equal to a certain difference.

Fifth Embodiment

A common mode choke coil 24, serving as a coil component, according to a fifth embodiment of the present disclosure is described with reference to FIG. 11.

In the fifth embodiment, unlike in the first embodiment, switching positions 18 in the twisted wire portion are not shifted in the circumferential direction D. In the fifth embodiment, as shown in FIG. 11, when viewed from a mount board, the total length of a portion of the first wire 3 that is closer to the mount board than the second wire 4 and the total length of a portion of the second wire 4 that is closer to the mount board than the first wire 3 are equal to each other in each turn of the twisted wire portion.

According to such a structure, the length of the portion of the first wire 3 that is closer to the mount board and the length of the portion of the second wire 4 that is closer to the mount board can be the same in each turn. Therefore, even the fifth embodiment provides the same effects as those provided by the first to fourth embodiments.

Sixth Embodiment

A common mode choke coil 25, serving as a coil component, according to a sixth embodiment of the present disclosure is described with reference to FIG. 12.

The sixth embodiment has similar characteristics to those according to the above-described fifth embodiment. That is, when viewed from a mount board, the total length of a portion of the first wire 3 that is closer to a mount board than the second wire 4 and the total length of a portion of the second wire 4 that is closer to the mount board than the first wire 3 are equal to each other in each turn of the twisted wire portion.

Figure 11:
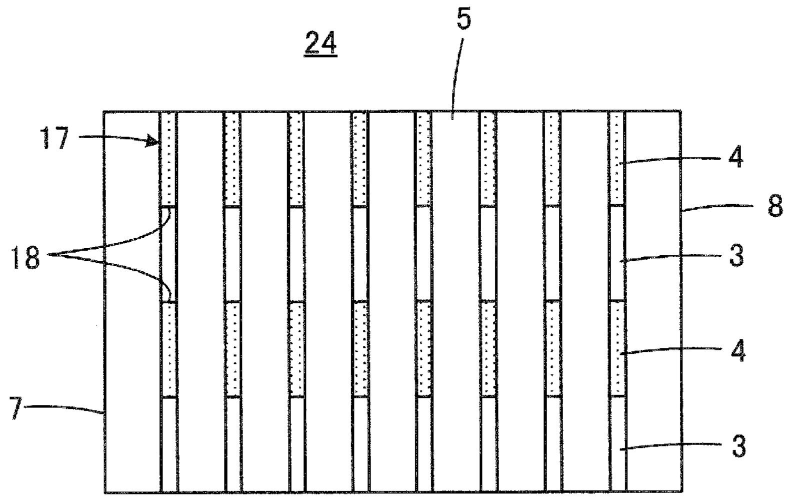
FIG. 11 shows in the form shown in FIG. 2B a wound state of first and second wires viewed from a mount-board side of a common mode choke coil according to a fifth embodiment of the present disclosure.
Figure 12:
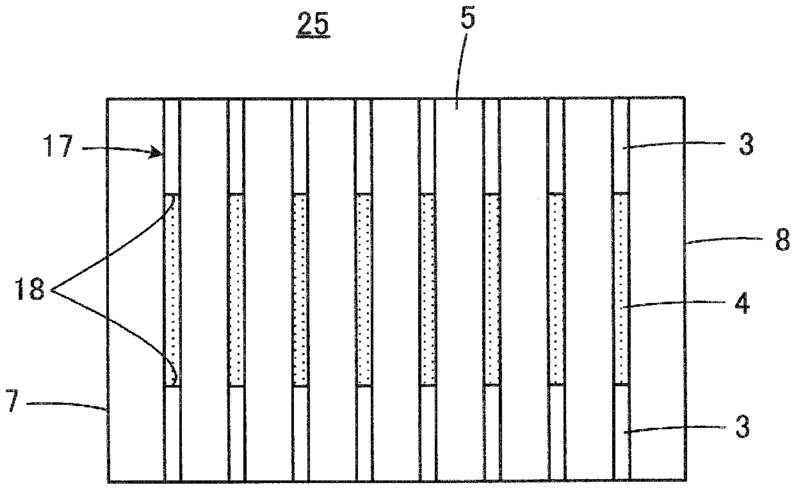
FIG. 12 shows in the form shown in FIG. 2B a wound state of first and second wires viewed from a mount-board side of a common mode choke coil according to a sixth embodiment of the present disclosure.

In the fifth embodiment, as shown in FIG. 11, there are four switching positions 18 for one turn, whereas, in the sixth embodiment, as shown in FIG. 12, there are two switching positions 18.

Seventh Embodiment

Figure 13:
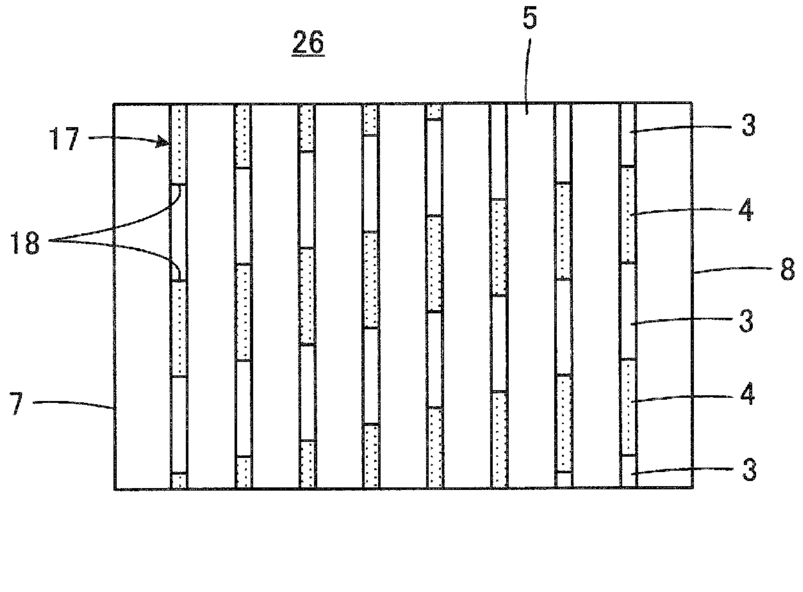
FIG. 13 shows in the form shown in FIG. 2B a wound state of first and second wires viewed from a mount-board side of a common mode choke coil according to a seventh embodiment of the present disclosure.

A common mode choke coil 26, serving as a coil component, according to a seventh embodiment of the present disclosure is described with reference to FIG. 13.

The seventh embodiment also has similar characteristics to those according to the above-described fifth embodiment. The seventh embodiment differs from the fifth embodiment in that switching positions 18 of a first wire 3 and a second wire 4 in the twisted wire portion are shifted in a circumferential direction D of a winding core portion 5. Even here, when viewed from a mount board, the total length of a portion of the first wire 3 that is closer to the mount board than the second wire 4 and the total length of a portion of the second wire 4 that is closer to the mount board than the first wire 3 are kept equal to each other in each turn of the twisted wire portion.

Eighth Embodiment

Figure 14:
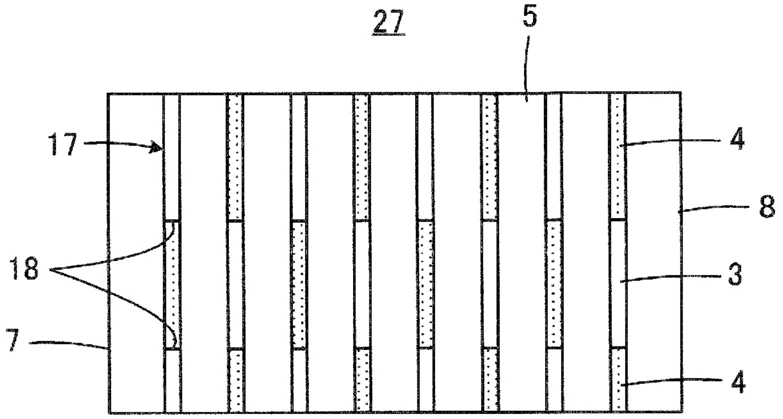
FIG. 14 shows in the form shown in FIG. 2B a wound state of first and second wires viewed from a mount-board side of a common mode choke coil according to an eighth embodiment of the present disclosure.

A common mode choke coil 27, serving as a coil component, according to an eighth embodiment of the present disclosure is described with reference to FIG. 14.

In the fifth to seventh embodiments, when viewed from a mount board, the total length of the portion of the first wire 3 that is closer to the mount board than the second wire 4 and the total length of the portion of the second wire 4 that is closer to the mount board than the first wire 3 are equal to each other in each turn. However, in the eighth embodiment, as shown in FIG. 14, they are equal to each other in each two turns of the twisted wire portion that are adjacent to each other.

According to such a structure, the total length of the portion of the first wire 3 that is closer to the mount board and the total length of the portion of the second wire 4 that is closer to the mount board can be made equal to each other in each two turns.

Such a structure according to the eighth embodiment is realized when the number of switchings in one turn of the first wire 3 and the second wire 4 is an odd number.

When viewed from the mount board, the total length of the portion of the first wire 3 that is closer to the mount board than the second wire 4 and the total length of the portion of the second wire 4 that is closer to the mount board than the first wire 3 are equal to each other in each turn of the twisted wire portion in the fifth to seventh embodiments and in each two turns of the twisted wire portion that are adjacent to each other in the eighth embodiment. However, they may be equal to each other in each three or more turns that are adjacent to each other. That is, when they may be equal to each other in each N turns of the twisted wire portion that are adjacent to each other, and N is a natural number including one.

In the above-described first to eighth embodiments, it is desirable that a surface of the winding core portion 5 facing the mount board be a planar surface that is parallel to the mount board, and it is more desirable that the sectional shape of the winding core portion 5 that is perpendicular to a central axis thereof be a substantially rectangular shape. According to this structure, regarding the first wire 3 and the second wire 4, the stray capacitance occurring between the portion of the first wire 3 that is closer to the mount board and the stray capacitance occurring between the portion of the second wire 4 that is closer to the mount board are proportional to the length of the portion of the first wire 3 that is closer to the mount board and the length of the portion of the second wire 4 that is closer to the mount board. Therefore, it becomes easier to provide a design for equalizing the stray capacitance occurring in association with the first wire 3 and the stray capacitance occurring in association with the second wire 4.

In contrast, in the embodiments described below, the sectional shape of a winding core portion 5 that is perpendicular to a central axis thereof is a substantially protruding shape extending towards a mount board. In this case, in order to reduce the difference between a first stray capacitance occurring between a first wire 3 and the mount board and a second stray capacitance occurring between a second wire 4 and the mount board, of the first wire 3 and the second wire 4, as viewed from the mount board, an opposing area of the nearer wire opposing the mount board is smaller than an opposing area of the farther wire opposing the mount board.

Ninth Embodiment

A common mode choke coil 28, serving as a coil component, according to a ninth embodiment of the present disclosure is described with reference to FIGS. 15 and 16.

Figure 15:
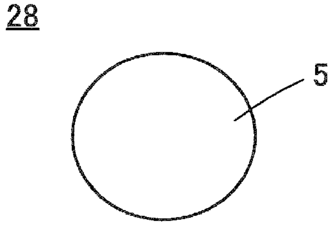
FIG. 15 shows a sectional shape that is perpendicular to a central axis of a winding core portion of a common mode choke coil according to a ninth embodiment of the present disclosure.
Figure 16:
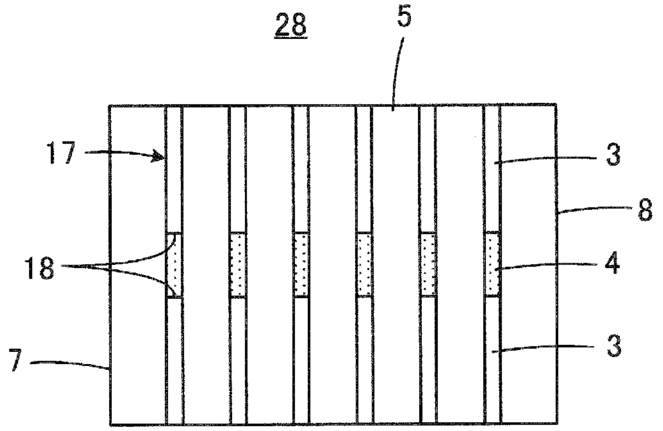
FIG. 16 shows in the form shown in FIG. 2B a wound state of first and second wires viewed from a mount-board side of the common mode choke coil including the winding core portion shown in FIG. 15.

In the ninth embodiment, as shown in FIG. 15, the sectional shape of the winding core portion 5 that is perpendicular to a central axis thereof is substantially circular. The substantially circular shape may refer to a perfect circle or an elliptical shape. As shown in FIG. 16, in twisted wire portion of the first wire 3 and the second wire 4, when viewed from the mount board, a facing area of the nearest wire (in this case the second wire 4) to the mount board between the first wire 3 and the second wire 4 is smaller than a facing area of the other wire (that is, the first wire 3) between the first wire 3 and the second wire 4.

As the facing area of a pair of electrodes that face each other is increased, the electrostatic capacity increases; and, as the distance between the pair of electrodes decreases, the electrostatic capacity increases. Therefore, the above-described structure makes it possible to balance the stray capacitance at the first wire 3 and the stray capacitance at the second wire 4.

Such a twisted wire portion of the wire 3 and the wire 4 is even used in the tenth to thirteenth embodiments below.

Tenth Embodiment

Figure 17:
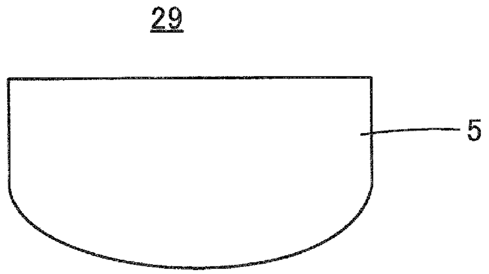
FIG. 17 shows a sectional shape of a winding core portion that is perpendicular to a central axis of the winding core portion of a common mode choke coil according to a tenth embodiment of the present disclosure.

FIG. 17 shows the winding core portion 5 of a common mode choke coil 29, serving as a coil component, according to the tenth embodiment of the present disclosure.

In the tenth embodiment, the sectional shape of the winding core portion 5 that is perpendicular to a central axis thereof is such that a bottom side of a substantially oblong rectangular shape is rounded into a substantially protruding shape. In this case, the bottom side faces the mount board.

Eleventh Embodiment

Figure 18:
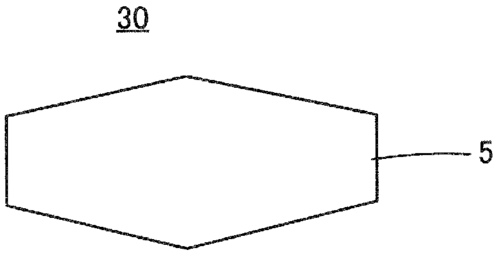
FIG. 18 shows a sectional shape of a winding core portion that is perpendicular to a central axis of the winding core portion of a common mode choke coil according to an eleventh embodiment of the present disclosure.

FIG. 18 shows the winding core portion 5 of a common mode choke coil 30, serving as a coil component, according to the eleventh embodiment of the present disclosure.

In the eleventh embodiment, the sectional shape of the winding core portion 5 that is perpendicular to a central axis thereof is a substantially flat hexagonal shape. In this case, two downwardly facing sides in FIG. 18 face the mount board.

Twelfth Embodiment

Figure 19:
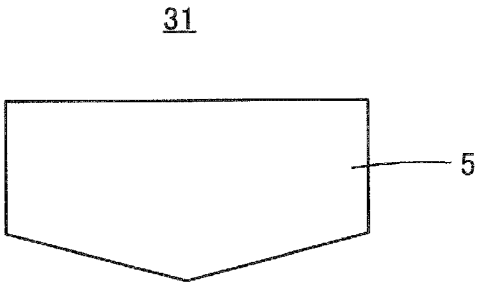
FIG. 19 shows a sectional shape of a winding core portion that is perpendicular to a central axis of the winding core portion of a common mode choke coil according to an twelfth embodiment of the present disclosure.

FIG. 19 shows the winding core portion 5 of a common mode choke coil 31, serving as a coil component, according to the twelfth embodiment of the present disclosure.

In the twelfth embodiment, the sectional shape of the winding core portion 5 that is perpendicular to a central axis thereof is a substantially pentagonal shape including a substantially triangular shape in which two sides of a substantially protruding shape are formed on a bottom side of a substantially oblong rectangular shape. In this case, two downwardly facing sides in FIG. 19 face the mount board.

Regarding the embodiment shown in FIG. 19, for example, the winding core portion 5 may have a sectional shape whose upper and lower sides are the reverse of those of the shape shown in FIG. 19, in which the bottom side is flat and the upper side has a substantially protruding shape instead of being flat.

Thirteenth Embodiment

Figure 20:
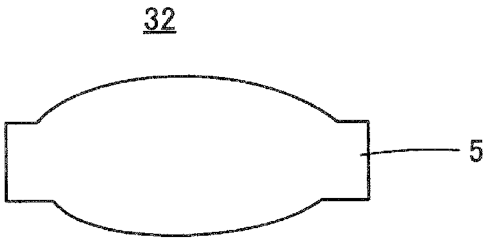
FIG. 20 shows a sectional shape of a winding core portion that is perpendicular to a central axis of the winding core portion of a common mode choke coil according to a thirteenth embodiment of the present disclosure.

FIG. 20 shows the winding core portion 5 of a common mode choke coil 32, serving as a coil component, according to the thirteenth embodiment of the present disclosure.

In the thirteenth embodiment, the sectional shape of the winding core portion 5 that is perpendicular to a central axis thereof is a shape including two substantially rectangular protruding portions on respective ends of a substantially oblong ellipse in a major-axis direction thereof. In this case, the downwardly facing sides in FIG. 20 face the mount board.

In all of the embodiments described above, it is desirable that the number of turns of the first wire 3 and the second wire 4 be about 15 or more. For example, in the winding-type coil component having a planar dimension of about 4.5 mm×3.2 mm, when the number of turns is about 15 or more, it is possible to obtain an inductance of at least about 50 μH.

In the structure according to the comparative example shown in FIG. 4, the difference between the stray capacitance at the first wire 3 and the stray capacitance at the second wire 4 accumulates with every turn. Therefore, in proportion to the number of turns, the difference increases. Consequently, as described above, as the number of turns increases, the structure according to the present disclosure becomes more effective.

In all of the embodiments, it is desirable that the number of twists of the twisted wire portion per one turn be about three or less, that is, the number of switchings of the first wire 3 and the second wire 4 in the twisted wire portion per one turn be about six or less. In this way, when the number of twists is about three or less, the opposing area between the mount substrate and one of the two wires 3 and 4 and the opposing area between the mount substrate and the other of the two wires 3 and 4, and the distance between the mount substrate and one of the two wires 3 and 4 and the distance between the mount substrate and the other of the two wires 3 and 4 tend to differ from each other. Therefore, mode conversion characteristics tend to deteriorate. Consequently, the structure according to present disclosure is more effective.

The phrase "the number of twists is "about three or less"" may refer to the number of twists that correspond to an odd number of switchings, such as 0.5, 1.5, or 2.5. Since the number of twists per one turn is an issue, for example, the number of twists may be intermediate values, such as 2.1 to 2.9. However, as described above, although some modifications can be considered, it is desirable that the number of twists be an integral number from the start of the winding to the end of the winding.

The first wire 3 and the second wire 4 may be wound in about two layers or more. In this way, when they are wound in about two layers or more, basically, a portion of the wire that forms an outermost layer only needs to satisfy the structure according to the present disclosure. In other words, the two wires may be arbitrarily switched in an inner layer.

Although the present disclosure is described in relation to the embodiments of the illustrated common mode choke coils, the present disclosure is applicable to, for example, BALUN or transformers.

Although the illustrated embodiments are exemplifications, the structures according to different embodiments may be partly replaced or combined.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A winding-type coil component, comprising:

a core including a winding core portion and a first flange portion and a second flange portion, the first flange portion and the second flange portion being provided on a first end of the winding core portion and a second end of the winding core portion, respectively, the first end and the second end being opposite to each other; and a first wire and a second wire wound around the winding core portion with substantially the same number of turns, not electrically connected to each other, and having a twisted wire portion where the first wire and the second wire are twisted together, wherein the winding-type coil component is configured to be mounted on a mount board with the winding core portion oriented parallel to the mount board, a sectional shape of the winding core portion that is perpendicular to a central axis thereof is a substantially protruding shape extending towards the mount board, and when viewed from the mount board, a facing area of the nearest wire to the mount board between the first wire and the second wire is smaller than a facing area of the other wire between the first wire and the second wire, and the other wire between the first wire and the second wire extends from the nearest wire to a first edge of the core and extends from the nearest wire to a second edge of the core opposite from the first edge.

2. The winding-type coil component according to claim 1, further comprising:

a first terminal electrode and a third terminal electrode that are provided on the first flange portion; and a second terminal electrode and a fourth terminal electrode that are provided on the second flange portion, wherein one end portion and the other end portion of the first wire is connected to the first terminal electrode and the second terminal electrode, respectively, and one end portion and the other end portion of the second wire is connected to the third terminal electrode and the fourth terminal electrode, respectively.

3. The winding-type coil component according to claim 2, wherein the winding-type coil component is a common mode choke coil.

4. The winding-type coil component according to claim 1, wherein the number of turns of each of the first and second wires is about 15 or more.

5. The winding-type coil component according to claim 1, wherein the number of twists of the twisted wire portion per one turn is about three or less.

* * * * *